United States Patent [19]

Yasutake

[11] Patent Number: 4,881,427
[45] Date of Patent: Nov. 21, 1989

[54] CRANKSHAFT OF INTERNAL COMBUSTION ENGINE AND METHOD OF PRODUCING THE SAME

[75] Inventor: Kousuke Yasutake, Kawagoe, Japan

[73] Assignee: Honda Giken Kogyo Kabushiki Kaisha, Tokyo, Japan

[21] Appl. No.: 205,032

[22] Filed: Jun. 2, 1988

Related U.S. Application Data

[63] Continuation of Ser. No. 861,653, May 5, 1986, abandoned, which is a continuation of Ser. No. 495,696, May 18, 1983, abandoned.

[30] Foreign Application Priority Data

Oct. 21, 1982 [JP] Japan .................................. 57-185180

[51] Int. Cl.$^4$ .............................................. F16C 3/04
[52] U.S. Cl. ........................................ 74/603; 74/595
[58] Field of Search ................ 74/595, 603, 598; 29/6

[56] References Cited

U.S. PATENT DOCUMENTS

| | | | |
|---|---|---|---|
| 209,836 | 11/1878 | Roberts | 74/595 X |
| 276,910 | 5/1883 | Skinner | 74/603 |
| 297,313 | 4/1884 | Tabor | 74/603 |
| 314,788 | 3/1885 | Bole | 74/595 |
| 314,789 | 3/1885 | Bole | 74/595 |
| 465,699 | 12/1891 | Hardwick | 74/603 |
| 561,071 | 5/1896 | Armstrong | 74/603 |
| 1,186,547 | 6/1916 | Chapman | 74/595 |
| 1,515,034 | 11/1924 | Griswold | 29/6 |
| 1,534,411 | 4/1925 | Potter | 29/6 X |
| 1,792,786 | 2/1931 | Walker | 74/595 X |
| 3,266,118 | 8/1966 | Drew | 29/6 |
| 3,347,112 | 10/1967 | Thun | 74/594.2 |
| 3,748,925 | 7/1973 | Stewart | 74/603 |
| 4,015,908 | 4/1977 | Ashley | 29/6 X |
| 4,094,048 | 6/1978 | Broder | 29/6 |
| 4,132,513 | 1/1979 | Kulina | 74/603 X |
| 4,305,311 | 12/1981 | McGill | 74/595 |

FOREIGN PATENT DOCUMENTS

| | | | |
|---|---|---|---|
| 3336444 | 4/1984 | Fed. Rep. of Germany | 74/603 |
| 369034 | 12/1906 | France | 74/595 |
| 817382 | 9/1937 | France | 74/567 |

*Primary Examiner*—Rodney M. Lindsey
*Attorney, Agent, or Firm*—Armstrong, Nikaido, Marmelstein, Kubovcik & Murray

[57] ABSTRACT

A crankshaft is provided which comprises a crankshaft body which is formed by forging. The crankshaft body includes a plurality of adjacent web core portions, crank pins interconnecting adjacent web core portions and journals which extend from the outermost of the adjacent web core portions. A plurality of balancer weights are formed by casting. Each of the balancer weights are integrally fored with, and surround, a corresponding one of the web core portions. Further, a method for manufacturing the crankshaft is disclosed.

5 Claims, 3 Drawing Sheets

FIG. 1  PRIOR ART
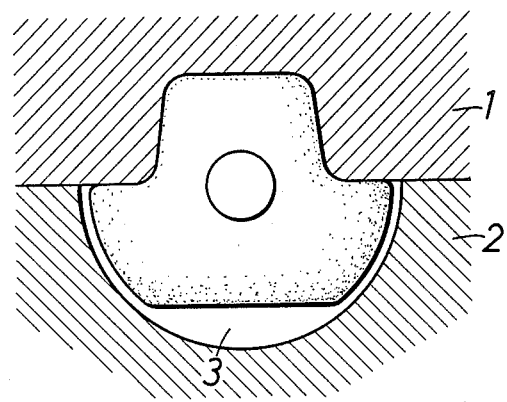
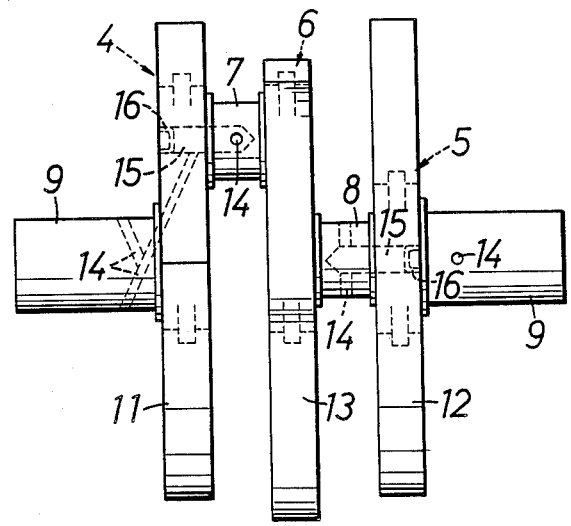
FIG. 3
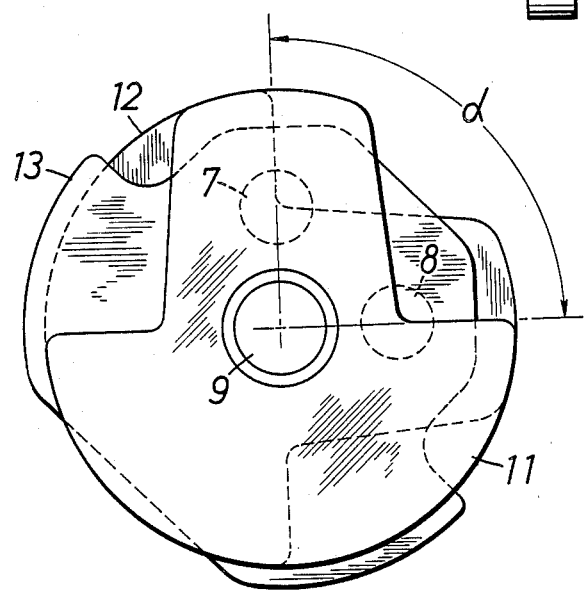

4,881,427

CRANKSHAFT OF INTERNAL COMBUSTION ENGINE AND METHOD OF PRODUCING THE SAME

This application is a continuation of application Ser. No. 861,653 filed May 5, 1986 which is a continuation of Ser. No. 495,696 filed May 18, 1983 now abandoned.

BACKGROUND OF THE INVENTION

1. Field of the Invention

The present invention relates to a crankshaft for an internal combustion engine, the crankshaft having a balancer weight and also to a method of producing the same.

2. Description of the Prior Art

Generally a crankshaft of an internal combustion engine has, as its essential parts, journal portions (referred to simply as "journals" herein) rotatably supported by bearings, a crank pin portion (referred to simply as a "crank pin" herein) connected to one end of a connecting rod which, in turn, is connected at its other end to a piston slidably positioned in a cylinder, and crank web portions (referred to simply as "crank webs" herein) for supporting the crank pin. These essential parts of a crankshaft are required to provide sufficient mechanical strength to withstand various forces, such as the force produced as a result of the combustion, and the inertia force produced by reciprocating movements of the piston, rotational movements of the crankshaft itself and the like. It is an ordinary technique to attach a balancer weight to the crank web in order to attain a balance of the inertia forces acting on the crankshaft. The balancer weight has to be designed to have a suitable shape for achieving a satisfactory balancing function.

In producing a crankshaft by forging, it is rather easy to obtain the required mechanical strength at the journals and the crank pin, but the shape of the balancer weight is undesirably limited due to the conditions imposed by the die splitting process. In addition, as shown in FIG. 1, it is difficult to completely fill the innermost portions 3 of the die cavities in the dies 1 and 2 with the material of the crankshaft blank which plastically flows during forging. For this reason, forging is not suitable for the production of crankshafts, particularly of thin-walled crank webs having large diameter.

On the other hand, the production of crankshafts by casting cannot provide crankshafts with mechanical strength comparable to that of the forged product, although it offers a greater degree of freedom in shape and, hence, permits the formation of a balancer weight of any desired shape.

Accordingly, it is a primary object of the invention to provide a crankshaft for an internal combustion engine which is improved to permit the formation of the balancer weight in any desired shape while ensuring sufficient mechanical strength of the crankshaft without substantial difficulty, as well as a method of producing such an improved crankshaft.

To this end, according to the invention, a crankshaft having a balancer weight is produced by forming the main parts of the crankshaft including journals, crank pins and crank webs from a steel and then forming and integrating a balancer weight with each crank web around the core part of the latter by casting.

The above and other objects, features and advantages of the invention will become clear from the following description of a preferred embodiment taken in conjunction with the accompanying drawings.

BRIEF DESCRIPTION OF THE DRAWINGS

FIG. 1 is an illustration of a conventional process for fabricating a crankshaft;

FIG. 2-8 show a crankshaft in accordance with the preferred embodiment of the present invention wherein:

FIG. 2 is a front elevational view of the crankshaft;

FIG. 3 is a side elevational view of the crankshaft shown in FIG. 2;

FIG. 4 is a front elevational view of the body of the crankshaft;

FIG. 5 is a side elevational view of the body of the crankshaft;

FIG. 6 is a side elevational view of a crank web closer to one end of the crankshaft;

FIG. 7 is a side elevational view of a central crank web; and

FIG. 8 is a side elevational view of a crank web closer to the other end of the crankshaft.

DESCRIPTION OF THE PREFERRED EMBODIMENT

Figure 4:
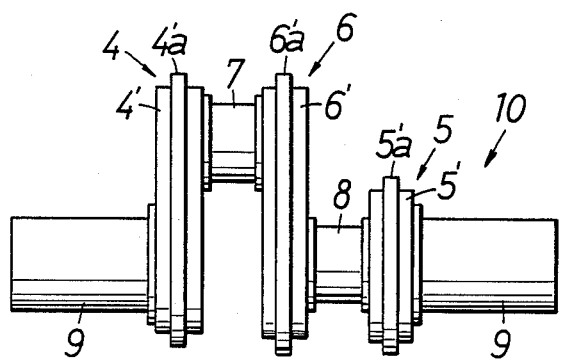

A preferred embodiment of the invention will be described hereinunder with reference to the accompanying drawings. Referring first to FIGS. 2 and 3, a 3-web and 2-pin type crankshaft is shown which is produced in accordance with an embodiment of the invention and which is suitable for use in a V-type engine. The crankshaft has both linear end portions constituting journals 9, two axially outer crank webs 4 and 5 connected to the respective journals 9, and a central crank web 6. A crank pin 7 is connected between the crank webs 4 and 6 and a crank pin 8 is connected between the crank webs 5 and 6. The crank pins 7 and 8 are so arranged that the angle $\alpha$ formed between the plane containing the axes of the crank pin 7 and the journal 9 and the plane containing the axes of the crank pin 8 and the journal 9 is 90°, although the angle may be made smaller or greater than 90° as required. Although not shown, two cylinders are disposed at an interposed angle of 45° therebetween and slidingly receive respective pistons connected to one end of the connecting rods which, in turn, are connected at their other ends to the crank pins 7 and 8, respectively.

Figure 5:
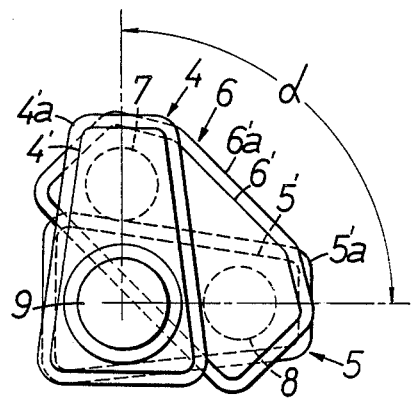

The crankshaft of the invention can be produced by the following process:

As the first step, as shown in FIG. 4 and FIG. 5, the main body 10 of the crankshaft including journals 9, crank pins 7,8 and crank web core parts 4', 5', 6' is formed by forging steel. More specifically, the web core parts 4', 5' and 6' are formed with respective peripheral ridges 4'a, 5'a and 6'a.

The main body of the crankshaft is then subjected to a rough finishing followed by a heat treatment and, if necessary, to a surface hardening treatment by LCN nitriding which is preferable for reducing the friction resistance on the surface.

Figure 6:
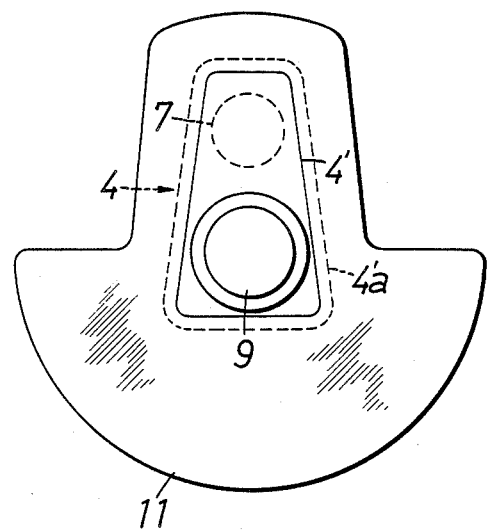
Figure 7:
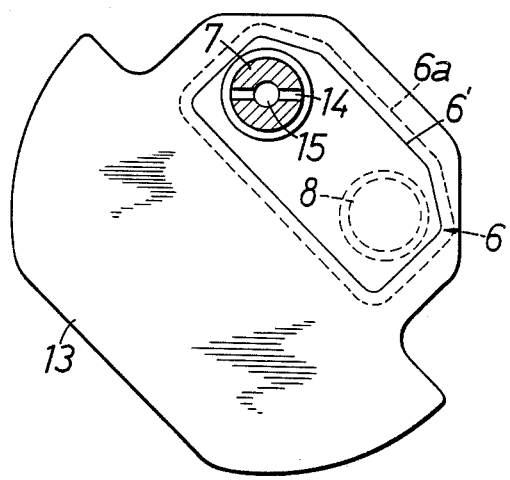
Figure 8:
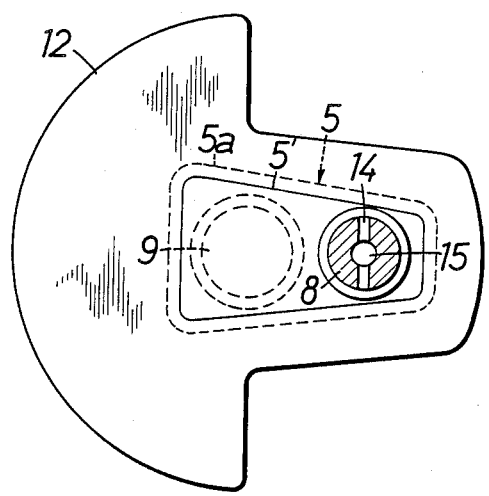

Then, using the web core portions 4', 5', 6' of the heattreated crankshaft body 10 as the core metals, balancer weights 11, 12 and 13 are formed by casting from iron to complete the crank webs 4, 5 and 6. Thus, in the crankshaft of this embodiment, the web core parts 4', 5' and 6' of the crankshaft body 10 are embedded, respectively, in the balancer weights 11, 12 and 13 which are cast from an iron. Both axially outer crank webs having an upper side and a lower side where the upper side is parallel to and shorter in length than the lower side. Divergently inclined sides extend between the upper and lower sides to form the trapezoidal shape. 4 and 5 are shown in side elevations in FIGS. 6 and 8, while FIG. 7 shows the central web 6 also in side elevation having a substantially rectangular shape with two corners, which are remote from the rotational axis of the crankshaft, being cut away. The substantially rectangular web core portion is elongated in a circumferential direction around the axis of the crankshaft.

The crankshaft with the balancer weights 11, 12 having a substantial portion disposed offset from the journal portion of the web core part (see FIGS. 6-8) while balancer weight 13 has a substantive portion disposed offset from the crank pin portion of the web core part. The crankshaft thus formed is then subjected to the final step of polishing.

The crankshaft has passages 14 and 15 for lubricating oil, formed by machining after the rough finishing. Plugs 16 close the open ends of the passages 15 extending through the crank pins 7 and 8 along the axes thereof.

It will be clear to those skilled in the art that the essential parts of the crankshaft of this embodiment exhibit sufficient mechanical strength because the body 10 of the crankshaft is formed by forged steel. In addition, the balancer weights 11, 12 and 13 can be formed to have any desired shapes for attaining the highest balancing effect because they are made by casting which affords a greater degree of freedom in design as compared with forging.

The peripheral ridges 4'a, 5'a and 6'a on a web core parts 4', 5' and 6' of the crankshaft body 10 serve to ensure the integration of the balancer weights 11, 12 and 13 with respective web core parts 4', 5' and 6' thus preventing offset or deviation of the balancer weights.

Although a 3-web 2-pin type crankshaft has been described, it will be obvious that the invention can equally be applied to other types of crankshafts, such as a 2-web, 1-pin type.

It is also possible to apply the invention to a built-up crankshaft produced by forming the journals 9, crank pins 7 and 8 and the web core parts 4', 5' and 6' separately and then assembling them together although, in the illustrated embodiment, the crankshaft is forged in a single body from the beginning. For instance, the invention does not exclude a production process wherein the crank webs are formed by casting the balancer weights around the web core parts and then assembled together with the journals and crank pins to form the crankshaft.

As will be fully understood from the foregoing description according to the invention, a crankshaft is formed first by forging the crankshaft main body including journals, crank pins and crank web core parts which requires strength from steel, and then by casting balancer weights around the crank web core parts from iron.

It is, therefore, possible to obtain any desired shape of the balancer weight for maximizing the balancing effect while attaining the required mechanical strength without substantial difficulty.

The present invention may be embodied in other specific forms without departing from the spirit or essential characteristics thereof. The presently disclosed embodiments are, therefore, to be considered as illustrative in all respects and not restrictive, the scope of the invention being indicated by the appended claims rather than the foregoing description and all changes which come within the meaning and range of equivalency of the claims are, therefore, to be embraced therein.

What is claimed is:

1. A crankshaft comprising:

a forged crankshaft body, said crankshaft body including a plurality of adjacent web core portions including two outer web core portions and one central web core portion located between the two outer web core portions, crank pins interconnecting adjacent web core portions, and journals defining an axis of rotation of the crankshaft and extending axially from the said outer web core portion, said outer web core portions being trapezoidal in section as viewed along said axis of said journals, said trapezoidal web core portions having a lesser-width at crank pin interconnected portions thereof than at journal extending portions thereof, said trapezoidal outer web core portions having upper and lower sides, said upper side being parallel to and shorter in length than said lower side, said trapezoidal web core portions having left and right divergently inclined sides extending between the upper and lower sides; and a plurality of balancer weights, each of said balancer weights being integrally formed with and surrounding a corresponding one of said web core portions, said balancer weights each having a substantial portion thereof disposed offset with respect to the journal extending portion of said web core portions to a side remote from said crank pin interconnected portions, wherein said central web core portion being directly connected with said two outer web core portions by said crank pins and said central web core portion having a substantially rectangular shape with two corners thereof, which are remote from the rotational axis of the crankshaft, being cut away.

2. A crankshaft as set forth in claim 1 wherein said web core portions have peripheral ridges formed thereon.

3. A crankshaft as set forth in claim 1 wherein said crankshaft body is steel and said balancer weights are iron.

4. A crankshaft according to claim 1, wherein said central web core portion is wholly surrounded by said cast balancer weight.

5. A crankshaft according to claim 1, wherein the substantially rectangular central web core portion is elongated in a circumferential direction around the axis of the crankshaft.

* * * * *